(12) United States Patent
Avitzur et al.

(10) Patent No.: US 8,176,098 B2
(45) Date of Patent: May 8, 2012

(54) OBTAINING INFORMATION FROM AN OBJECT

(75) Inventors: Aharon Avitzur, Ramat Efal (IL); Eran Simha, Tzur Moshe (IL); Elad Heart, Omer (IL); Robert Krien, Moshav Beit Shearim (IL); David Rachamim, Kfar Hanagid (IL); Eliezer Levy, Haifa (IL); Alla Volkov, Netanya (IL)

(73) Assignee: SAP AG, Walldorf (DE)

( * ) Notice: Subject to any disclaimer, the term of this patent is extended or adjusted under 35 U.S.C. 154(b) by 579 days.

(21) Appl. No.: 11/965,135

(22) Filed: Dec. 27, 2007

(65) Prior Publication Data

US 2009/0171931 A1  Jul. 2, 2009

(51) Int. Cl.
*G06F 7/00* (2006.01)
*G06F 17/30* (2006.01)

(52) U.S. Cl. ........................................ 707/809
(58) Field of Classification Search .................. 707/809, 707/713, 736
See application file for complete search history.

(56) References Cited

U.S. PATENT DOCUMENTS

| | | | | |
|---|---|---|---|---|
| 6,604,100 | B1 * | 8/2003 | Fernandez et al. .................... | 1/1 |
| 6,785,673 | B1 * | 8/2004 | Fernandez et al. .................... | 1/1 |
| 7,031,956 | B1 * | 4/2006 | Lee et al. ............................... | 1/1 |

OTHER PUBLICATIONS

Chamberlin, Don, "XQuery: A Query Language for XML", Feb. 15, 2001.*
'XML Query Use Cases' [online]. Chamberlin et al., 2006 [retrieved on Dec. 27, 2007]. [Retrieved from the Internet: URL:http://www.w3.org/TR/2006/WD-xquery-use-cases-20060608/, 95 pages.
BEA AquaLogic Data Services Platform: XQuery Developer's Guide, Version 2.0.1, Document Date: Jun. 2005, Revised: Sep. 2005, BEA Systems, Inc., 92 pages.

* cited by examiner

*Primary Examiner* — Greta Robinson
*Assistant Examiner* — Jeffrey Chang
(74) *Attorney, Agent, or Firm* — Fish & Richardson P.C.

(57) ABSTRACT

Among other disclosure, a computer-implemented method for obtaining information from an object includes receiving a query configured to extract information from a non-XML object. The non-XML object is created using an object model that provides for: (1) organizing attributes under nodes in a hierarchy; and (2) creating, within the non-XML object, associations between the nodes, also to nodes in another non-XML object. The method includes identifying in the received query any portion thereof that is non-standard with regard to XQuery language. The method includes creating an XML document from the non-XML object using at least the non-standard portion identified in the query. The method includes performing a revised query on the created XML document, the revised query corresponding to the query and being formulated using the XQuery language. The method includes recording, as a response to the query, a result of the revised query.

14 Claims, 7 Drawing Sheets

OBTAINING INFORMATION FROM AN OBJECT

TECHNICAL FIELD

This document relates to obtaining information from an object.

BACKGROUND

Most computer systems use objects of one or more kinds. Objects have in the past been formulated with a complexity ranging from less complex ones (i.e., corresponding to a relatively simple object model) to more sophisticated ones, where the object model provides for a multitude of capabilities. Instances of objects are typically created, used and stored in computer systems for one or more purposes. Modifications can also be performed according to the specifics of the particular implementation.

When object instances are stored, it is sometimes necessary or desired to search for contents of one or more objects. For example, a sales system for an online bookstore can be organized around a database that contains book objects representing the various available books. A user can then be provided with the ability to search the database for books that meet one or more criteria entered by the user. Performing such a query and responding to it can involve a search of one or more book objects in the database.

SUMMARY

The invention relates to obtaining information from an object.

In a first aspect, a computer-implemented method for obtaining information from an object includes receiving a query configured to extract information from a non-XML object. The non-XML object is created using an object model that provides for: (1) organizing attributes under nodes in a hierarchy; and (2) creating, within the non-XML object, associations between the nodes, also to nodes in another non-XML object. The method includes identifying in the received query any portion thereof that is non-standard with regard to XQuery language. The method includes creating an XML document from the non-XML object using at least the non-standard portion identified in the query. The method includes performing a revised query on the created XML document, the revised query corresponding to the query and being formulated using the XQuery language. The method includes recording, as a response to the query, a result of the revised query.

Implementations can provide any, all, or none of the following features. Creating the XML document can include identifying in the non-XML object any information necessary for performing the revised query; extracting the identified information from the non-XML object; and including the extracted information in the XML document. The received query can identify the non-XML object, and not the XML document, as a source for the query. The query can identify at least one association in the non-XML object and request information retrieval regarding the identified at least one association. The non-XML object can include multiple associations, the query can identify fewer than all of the multiple associations and identify at least one attribute under the multiple associations, and the method can further include: identifying at least one attribute under the multiple associations in at least one of the non-XML object and the other non-XML object referred to by any of the multiple associations; extracting the identified at least one attribute; and including the extracted attribute in the XML document. The non-standard portion of the query can be a path definition identifying a part of the object, the path definition not formulated according to the XQuery language. The method can further include: interpreting a symbolic expression in the received query as signifying that up to a predetermined number of levels in the path definition have been omitted in the received query; identifying in the non-XML object any information whose object path corresponds to the path definition taking into account the interpreted symbolic expression; extracting the identified information from the non-XML object; and including the extracted information in the XML document. Receiving the query can include: generating a graphical user interface (GUI) configured for the object model; presenting, in the GUI and to a user, portions of the non-XML object such that any of the portions can be selected by the user; receiving an input corresponding to a selection in the GUI and by the user of at least one of the portions of the non-XML object; and formulating the query using the received input. The object model can be for SAP Business Objects.

In a second aspect, a computer program product tangibly embodied in a computer-readable medium and comprising instructions that when executed by a processor perform a method for obtaining information from an object. The method includes receiving a query configured to extract information from a non-XML object. The non-XML object is created using an object model that provides for: (1) organizing attributes under nodes in a hierarchy; and (2) creating, within the non-XML object, associations between the nodes, also to nodes in another non-XML object. The method includes identifying in the received query any portion thereof that is non-standard with regard to XQuery language. The method includes creating an XML document from the non-XML object using at least the non-standard portion identified in the query. The method includes performing a revised query on the created XML document, the revised query corresponding to the query and being formulated using the XQuery language. The method includes recording, as a response to the query, a result of the revised query.

In a third aspect, a computer program product tangibly embodied in a computer-readable medium, the computer program product including instructions that, when executed, generate on a display device a graphical user interface for obtaining information from an object. The graphical user interface includes an object identification area for a user to enter an identification of a non-XML object. The non-XML object is created using an object model that provides for: (1) organizing attributes under nodes in a hierarchy; and (2) creating, within the non-XML object, associations between the nodes, also to nodes in another non-XML object. The GUI includes an object portion selection area for presenting portions of the identified non-XML object such that any of them can be selected by the user. The GUI includes a query editing area for the user to enter a query formulated using XQuery language without explicitly identifying any document in XML format. An XML document is created to include any portion of the non-XML object selected by the user in the object portion selection area. The query entered by the user in the query editing area is performed on the created XML document.

Implementations can provide the following feature. The GUI can include a result presentation area presenting a result of performing the entered query on the created XML document.

In a fourth aspect, a computer system includes a plurality of non-XML objects created using an object model that provides for: (1) organizing attributes under nodes in a hierarchy; and (2) creating, within each of the non-XML objects, associations between the nodes, also to nodes in another of the non-XML objects. The system includes a query processor configured to: (i) receive a query configured to extract information from at least one of the non-XML objects, (ii) identify in the received query any portion thereof that is non-standard with regard to XQuery language, and (iii) create an XML document from the non-XML object using at least the non-standard portion identified in the query. The system includes an XQuery processor configured to perform a revised query on the created XML document, the revised query corresponding to the query and being formulated using the XQuery language.

Implementations can provide the following feature. The query processor can further be configured to: (iv) generate a graphical user interface (GUI) configured for the object model; (v) present, in the GUI and to a user, portions of the non-XML object such that any of the portions can be selected by the user; (vi) receive an input corresponding to a selection in the GUI and by the user of at least one of the portions of the non-XML object; and (vii) formulate the query using the received input.

Implementations can provide any, all or none of the following advantages. Providing a powerful business query language for composing customized queries and transformations. Providing that an XQuery processor can be used also with queries that include non-standard expressions relative to the XQuery language. Providing, in a system using non-XML objects, that XML objects are efficiently created for purposes of performing queries using XQuery language.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
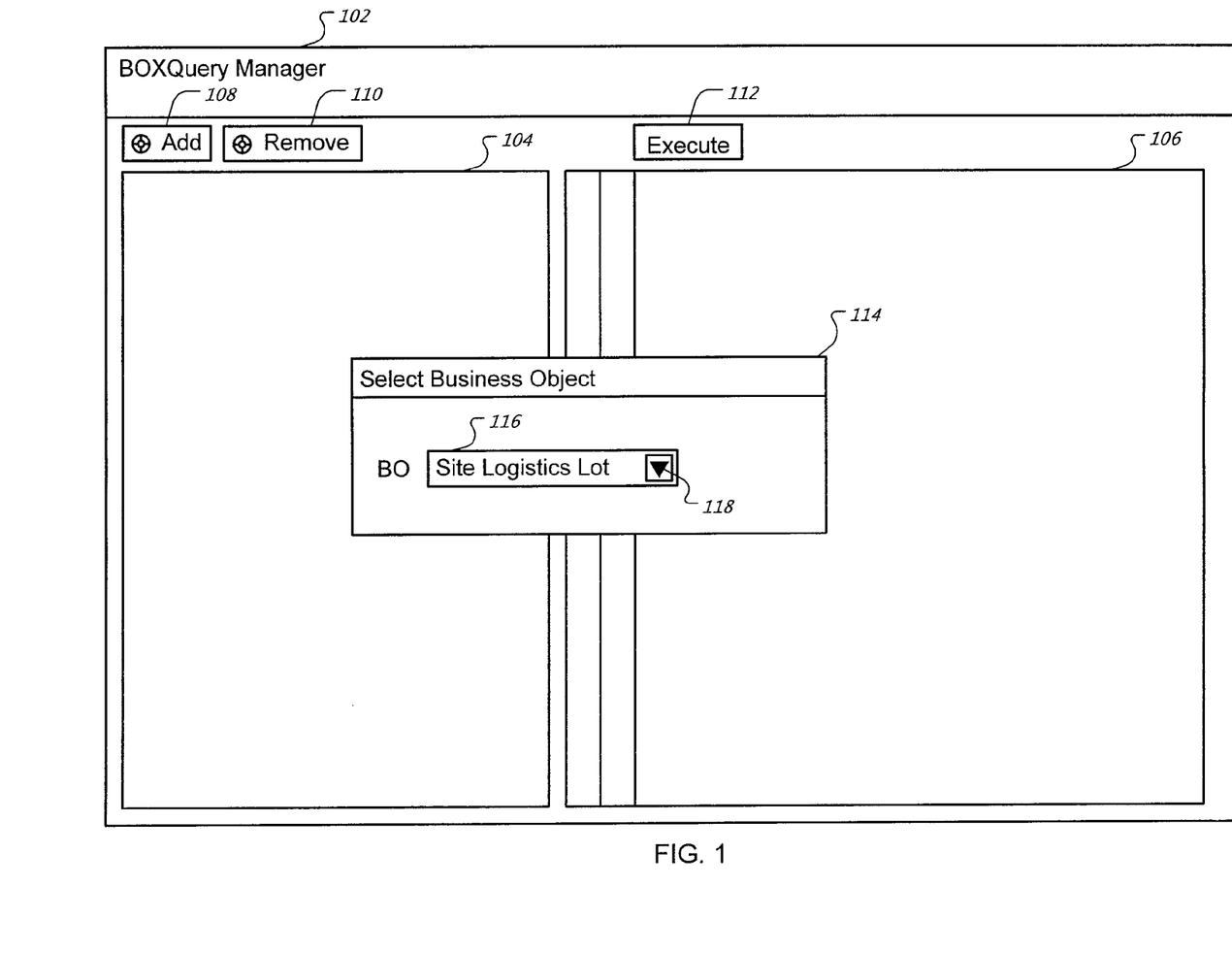
FIG. 1 is an exemplary screen shot of an interface for selecting a business object.

FIG. 1 is an exemplary screen shot 102 of an interface for selecting a business object. A scenario for specifying and executing a query can begin on a screen such as screen 102. For example, the screen 102 may be used in a system to query business objects, such as SAP business objects, or to query objects that may contain SAP business objects, etc. Such queries may, for example, extract information from a non-XML object or other object created using an object model (e.g., using SAP's object models). Object models in general may provide for organizing attributes under nodes in a hierarchy. Object models may also provide for creating associations between the nodes within a non-XML object and/or to nodes in other non-XML objects. As depicted, the screen 102 is titled "BOXQuery Manager" which may imply that the screen may be used in the system to query business objects (BOs) with some aspect of XQuery language used in the processing. BOXQuery can be used to initiate an XQuery query on business objects that are non-XML formatted.

In some implementations, the business objects available in products from SAP AG (sometimes referred to as BOs), or similar objects, can be used. A BO represents a specific view on a well-defined and outlined business content. The business content is something that is generally accepted and well known in the business world. A BO can therefore be a representation of a uniquely identifiable business entity described by a structural model, an internal process model, and one or more service interfaces. One or more implemented business processes can operate on BOs. Examples of BOs include, but are not limited to: Sales Order, Supplier Invoice, and Outbound Delivery.

In some implementations, most application logic is encapsulated in BOs. The BOs can be the basic elements of the application architecture. BO modeling can therefore cover the complete application platform scope. BO definition is usually driven by business relevance and experience.

BOs are sometimes classified into Business Process Objects (BPOs) and Master Data Objects (MDOs). BPOs are transactional BOs that can be time-point related. MDOs are BOs with mainly master data character and can be time span related. Defined BOs can be stored in a repository, such as the Enterprise Services Repository available from SAP AG, and implemented free of redundancies. There can also be defined a governance process, guidelines and/or rules for the BOs.

A business object (such as a BO from SAP AG) can be created according to a business object model that provides for a hierarchy of a root node and one or more nodes. Nodes of a business object can be in a directed relation which is called association. The associations of the BO node hierarchy are called compositions. Besides the compositions, additional associations between BO nodes can exist. When these associations go across BO boundaries, they are called cross-BO associations. In some implementations, cross-BO associations are not allowed across deployment units to avoid tight coupling. A deployment unit, for example, can include a separate computer hardware platform independent of other computer hardware platforms. Query services can be used to identify instances of BOs. A query can search for BO instances that match a defined parameter set. Results of queries can include sets of node identifiers. These identifiers can be used to access the data of a BO. Associations can be used to navigate in a BO structure. A service function can be provided to access services of BOs.

A query configured to extract information from a non-XML object may be handled in different ways. The non-XML object may be used to create an XML document, such as using non-standard portions identified in the query. A revised query can be created to operate on the XML document, and may be, for example, formulated using the XQuery language. An XQuery processor can then execute the revised query, returning the results corresponding to the query.

The screen 102 can include features for object identification and object portion selection. Each of these features may include one or more display areas to display objects that can be selected, and one or more selection areas for specifying a particular object or object portion. For example, a user of the screen 102 may use an object identification area to identify one or more objects that are to be queried. Once an object is selected, the user may use an object portion selection area to identify one or more specific portions of the object to query. The screen 102 can also include a query editing feature. The user may employ the query editing feature, for example, to build a query that includes the object and object portions that are specified for the query.

Identification of objects and object portions may be associated with the query in different ways. For example, in For-Let-Where-OrderBy-Return (or "FLOWR") expressions, commonly used in support of XQuery for querying XML documents, objects and object portions can be used in the Where component. When used in this way, the Where component filters tuples using a Boolean expression, identifying the logic by which the query is to be executed (e.g., which data is to be matched). In another example, objects and object portions can be used in the Return component, identifying the content of the results to be returned.

As depicted in FIG. 1, the screen 102 includes a business object area 104 and a query area 106. The business object area 104 can be used to display one or more objects to be queried. Such displays may also include detailed information for a specific object, such as nodes and associations. The user may employ an add button 108 to add objects to those displayed in the business object area 104. The user may also employ a remove button 110 to eliminate specific objects from those displayed in the business object area 104.

The query area 106 can provide the user with an area where the query is built, modified and subsequently submitted for execution. For example, after the query is completed in the query area 106, the user may select an execute button 112 to submit the query.

The business object area 104 and the query area 106 may include additional controls (not shown) for handling the data displayed in each area. For example, each of the areas 104 and 106 may include vertical scroll bars for scrolling up and down through data that may not fit on the screen at once (e.g. in the vertical direction). Similar, horizontal scroll bars may be used to scroll each of the areas in a left-to-right direction. Areas 104 an 106 may further be resizable, such as allowing the user to grab a corner (e.g., using a mouse) and drag or stretch the area into a new size. In some implementations, areas 104 and 106 may be divided by a line such that simply moving the line (e.g., with the mouse) to the left or right automatically narrows one area (e.g., the business object area 104) and while widening the other area (e.g., query area 106). Other controls may exist for shrinking a particular area (e.g., area 104 or 106) to an icon, such as to the bottom of the screen, and later restoring the area to its full size.

In some implementations, the user may be able to select from saved queries using a control (not shown), such as a control adjacent to the execute button 112. For example, the user may have defined and saved a query at an earlier time, and may use one or more controls to look up the saved query. To aid the user in locating such a query, the controls may have a search capability, such as to help the user find queries with titles or logic that contains a specific search string. Additional controls may allow the user to save a query, assign the query an alias or name, and subsequently look up the query using the alias. Other ways to find queries may be by last execution date or any other information associated with queries.

In one example scenario of specifying a query to be executed, the user may first select the add button 108 as a first step in identifying an object (e.g., business object) to be queried. As a result of the user selecting the add button 108, the system may display a business object selection interface 114. The user may employ a business object entry field 116 in the business object selection interface 114 to specify a particular business object. For example, the business object entry field 116 may allow the name of the business object (e.g., "Site Logistics Lot") to be typed in or selected from a scrollable list (e.g., by selecting an arrow control 118). For example, "site logistics" may signify operations to be performed in a warehouse facility, and "lot" may signify an object that collects information on the execution of activities that are requested by a corresponding "order" object.

Other ways to select a business object may include the use of a search capability, such as to generate a list of objects that contain "SITE." The business object selection interface 114 may be used repeatedly, once for each object that the user may want to display in the business object area 104. The user may exit the business object selection interface 114 by selecting an exit control (not shown), or the system may automatically remove the interface 114 upon user selection of a business object, to name a few examples.

In some implementations, initial entry to the screen 102 may automatically display the business object selection interface 114. For example, if the user is using the BOXQuery Manager for the first time, the screen 102 may be configured to automatically prompt the user for a business object (e.g., "Site Logistics Lot" or another business object). In this way, the system may not require the user to select the add button 108 when it may be clear that identification of an initial business object is likely needed.

Figure 2:
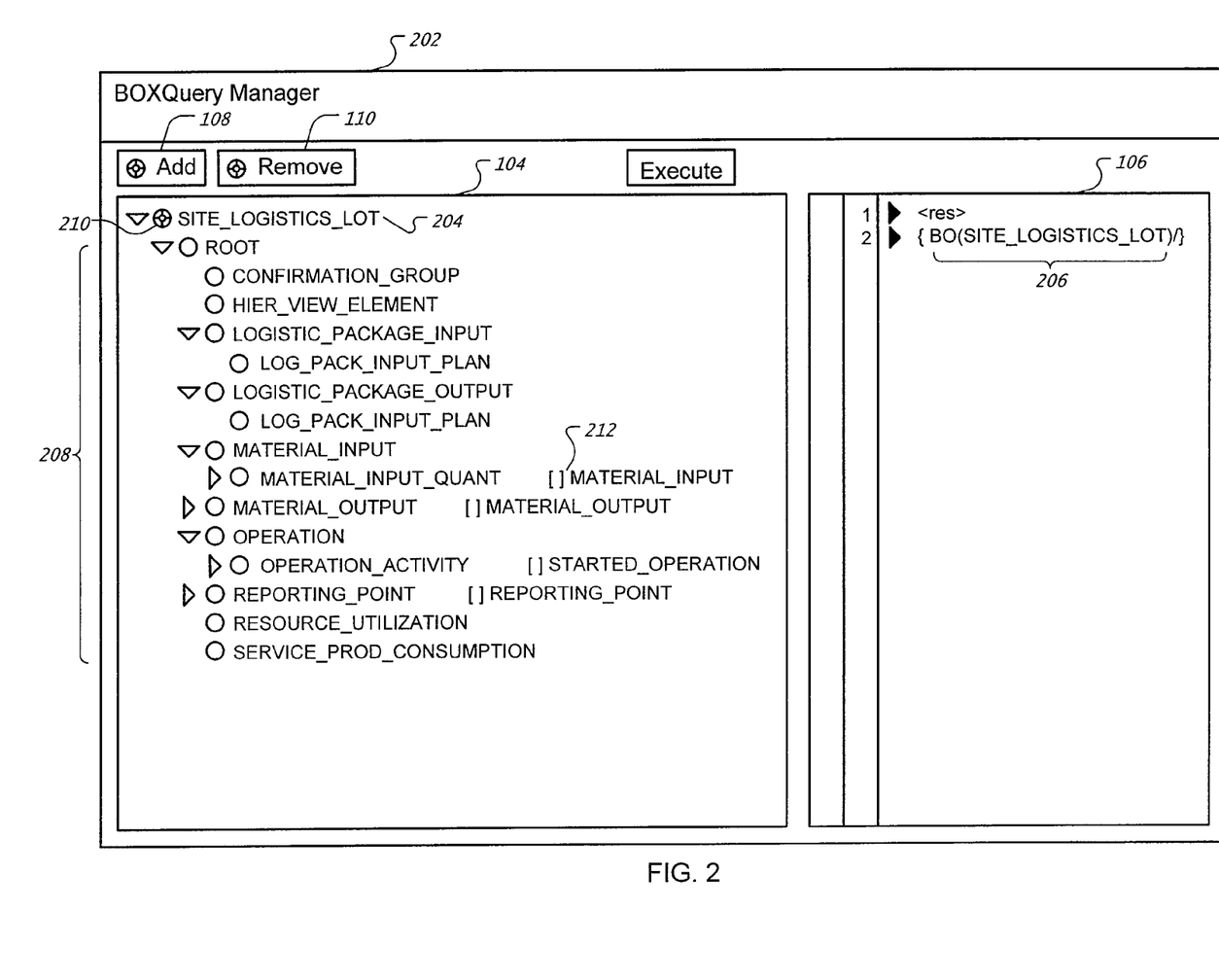
FIG. 2 is an exemplary screen shot of an interface showing hierarchical nodes of a business object.

Upon completion of this aspect of the screen 102, the query system can display the next screen of the query specification/execution scenario. FIG. 2 is an exemplary screen shot 202 of an interface showing hierarchical attributes of a business object. For example, the business object area 104 includes a business object header 204 (e.g., "Site Logistics Lot") from the business object selected using the business object entry field 116 (see FIG. 1). Also, the business object name (e.g., "Site Logistics Lot") is automatically embedded and displayed in a business object portion 206 in the query area 106. The current content in the area 206 identifies the object that is to be the target of the query using a business object identifier (e.g., the business object name), while the business object itself is not an XML object. The system can automatically supply or fill in key words (e.g., "res") and/or other syntax (e.g., brackets, etc.) in the business object portion 206 to make the current query at least partially correct syntactically.

The screen 202 can be part of a graphical user interface (GUI) configured for the object model, such as any of the object models used to support SAP business objects. As such, the GUI can present some or all of the non-XML object (e.g., the "Site Logistics Lot" business object) to the user. The user can select portions of the non-XML object for use in building a query in the query area 106. For example, the user may use the GUI to select portions of the non-XML object displayed in the business object area 104 to formulate the query. As another example, the user may further review other non-XML objects in the business object area 104 and select portions from those non-XML objects to modify the query.

One or more hierarchical nodes 208 from the business object are displayed beneath the business object header 204. As may be typical with some business objects, including some SAP business objects, the hierarchical nodes 208 may start with a "Root" node at a first-level indentation, with other nodes displayed after that. In general, one or more nodes indented under another node can indicate a hierarchical relationship, with the top-level node being a parent of the lower-level child nodes. For example, as indicated by circles at the first indentation level under the "Root" node, immediate children of the "Root" node include: CONFIRMATION_

GROUP, HIER_VIEW_ELEMENT, LOGISTIC_PACKAGE_INPUT, LOGISTIC_PACKAGE_OUTPUT, MATERIAL_INPUT, MATERIAL_OUTPUT, OPERATION, REPORTING_POINT, RESOURCE_UTILIZATION and SERVICE_PROD_CONSUMPTION.

Any one of the hierarchical nodes 208 that is itself a parent node with children can be annotated in the hierarchical nodes 208 to differentiate that node from other nodes having no children. For example, as depicted in FIG. 2, triangle symbols are used to identify nodes in the hierarchical nodes 208 that have sub-nodes or children. As such, the "Site Logistics Lot" business object header 204 includes a triangle symbol in front of the node name. The triangle points down, indicating that the "Site Logistics Lot" business object has its children displayed below the entry. As a result, the "Root" node and other child nodes of the "Site Logistics Lot" business object are displayed. By contrast, when a triangle points to the right, for example, it can signify that the details regarding child nodes are currently hidden. The user can optionally select (e.g., using a mouse) a particular triangle in order to toggle the display represented by the direction of the triangle. For example, if a triangle points to the right, clicking on the triangle can cause the node's child nodes to be displayed. Similarly, if a triangle points downward, clicking on the triangle can cause the node's child nodes to become hidden. In either case, the orientation of the triangle can change as a result. In some implementations, the system may be configured to automatically hide or display selected child nodes. Moreover, users may have personal configuration settings that can also control which child nodes are initially displayed for a given business object.

Special displays may be used to differentiate various elements in the business object area 104 and the query area 106. For example, an object symbol 210 can be used to indicate that the entity adjacent to the symbol 210 is a business object. Specifically, the cross-haired circle used for the symbol 210 adjacent to the business object header 204 (e.g., "Site Logistics Lot") identifies the entity as a business object. The symbol 210 can be repeated in other places in screens within the system, such as in the add button 108 and remove button 110. In this way, the buttons 108 and 110 can graphically depict their association with object-level user actions (e.g., adding and removing objects). The system may employ other graphics as well, such as color-coding or shading of same level nodes, color or shading of elements in the query area 106, and so on.

Nodes in the hierarchical nodes 208 may have a corresponding association, such as an association to another business object in the object model. For example, a "Material_Input" association 212 adjacent to the "Material_Input_Quant" node in the hierarchical nodes 208 identifies the "Material_Input_Quant" node as having an association with the business object "Material_Input". Such associations displayed in the business object area 104 may be used in building queries in the query area 106.

The user may use other information displayed in the business object area 104 to build queries in the query area 106. For example, using the information displayed in the business object area 104, the user may simply type in the name of an object, node or association. In another example, the user may select an object, node or association name and drag it into the query area 106. In yet another example, the user may click on the name of a node to view (and select from) in a list of corresponding associations. In some cases, associations for some nodes may appear in the query area 106 even though they may not appear explicitly in the business object area 104.

Figure 3:
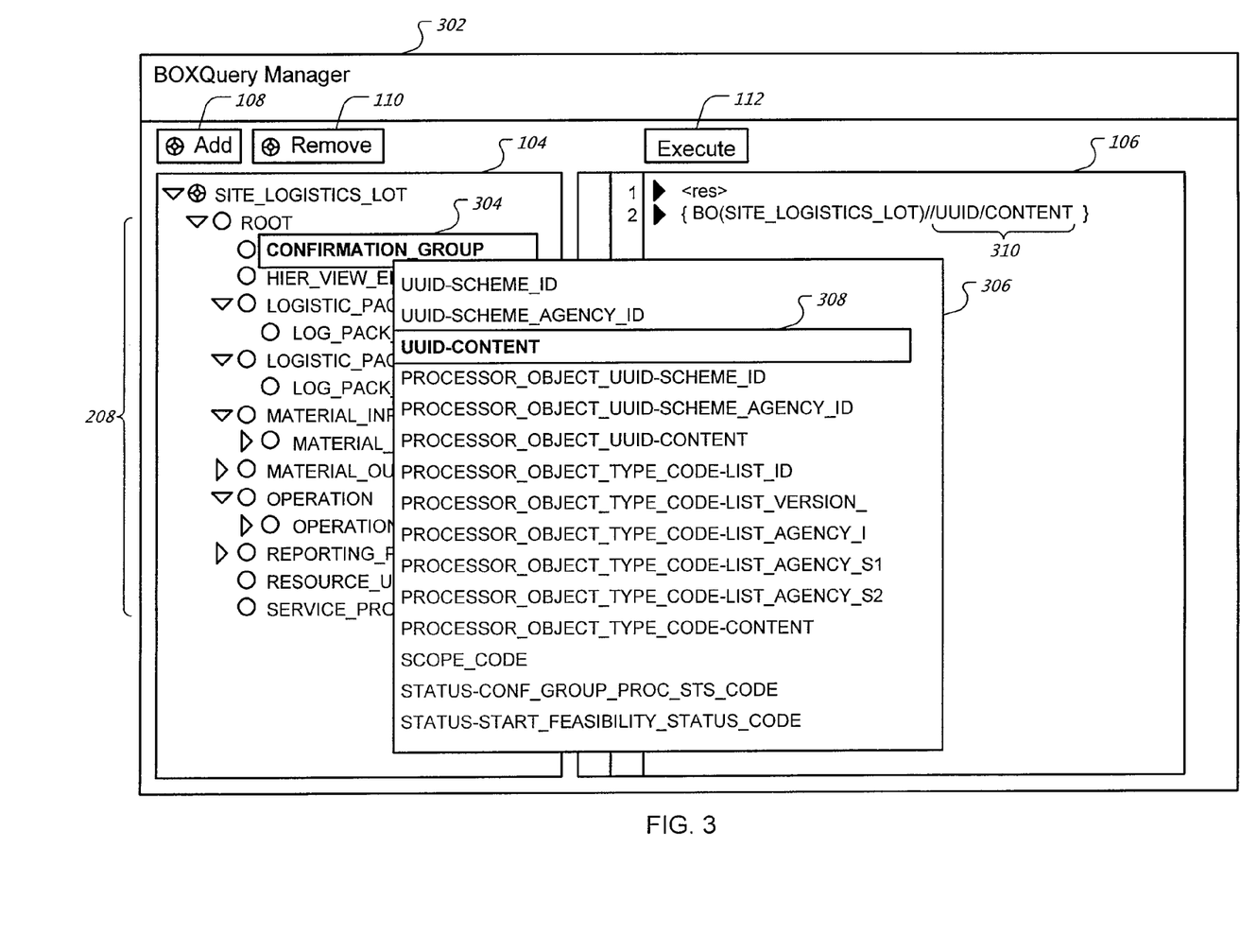
FIG. 3 is an exemplary screen shot of an interface for selecting a field of a business object for use in a query.

Upon completion of this aspect of the screen 202, the query system can display the next screen of the query specification/execution scenario. FIG. 3 is an exemplary screen shot 302 of an interface for selecting an attribute of a business object for use in a query. For example, the user can use the screen 302 to identify at least one feature (e.g., node or association) in the non-XML object selected in the screen 202. As a result of selecting the feature(s), the system can retrieve information for the feature(s), including information regarding associations as defined by the object model. Such information may be used, for example, during the execution of the query that the user builds in the query area 106 and subsequently causes to be executed.

The user can make a node selection 304 from the hierarchical nodes 208. For example, the user may select the "Confirmation Group" node as the node selection 304 if the user is building a query in the query area 106 that involves that attribute. In particular, the "Confirmation Group" attribute is here a part of the business object "Site Logistics Lot" that is already in the query. For instance, when selecting "Confirmation Group," the user may be building a query that involves the confirmation group corresponding to the execution of an order lot in a warehouse facility.

After the user has chosen a node selection 304, the system can display a list of node fields 306 corresponding to the node selection 304. For example, the list of node fields 306 depicts the associations corresponding to the "Confirmation Group" node selection 304. The user may select a field 308 from the list of node fields 306, such as the field "UUID-CONTENT." Upon selection of the field 308, the system can automatically insert the field 308 into a corresponding logic portion 310 of the query in the query area 106. For example, the UUID-CONTENT field can follow the object name Site Logistics Lot. Also, the system may insert one or more symbols (e.g., a number of slashes) into the query as a symbol of the predetermined number of hierarchy levels that exist between the top of the object and the selected field. For example, such a symbolic expression may be interpreted later when the query is executed. In a sense, the expression containing the object name, slashes (or other symbols) and association names may serve as a path definition for the attribute. Such a path definition can be identified as not being conformant with standards of the XQuery language; the identified definition can thereafter be used for extracting the information identified by the path and including the information in an XML object on which an XQuery can be performed. The system may also use other special characters to designate lists of associations at the same level, such as if the user selects an additional field from the list of node fields 306 for the "Confirmation Group" node selection 304.

Referring briefly to FIG. 2, if the user were to selects the "Material_Input" association 212 (or a different association) from the hierarchical nodes 208, a list or other interface analogous to the node fields 306 can be displayed. As such, the user may make one or more association-based selections for incorporation into the query in the query area 106.

The user may go on to use aspects of the screens 102-302 to select other objects, attributes and associations to use in the query in the query area 106. For example, the user may select a different attribute from the hierarchical nodes 208, then use the list of node fields 306 to select one or more associations. The system can automatically include such user selections in the query area 106. At the same time, the system may provide the user with additional GUI controls for constructing the query, such as to allow the user to specify Boolean operators that are part of the query.

In some implementations, the system may include logic that prevents the user from building queries that are incorrect with regards to the object model. For example, the user may select one business object for inclusion in the query (e.g., resulting in the BO(SITE_LOGISTICS_LOT) entry as shown), then inadvertently select an attribute from a different business object. The system may generate a message or in some way inform the user that the inconsistency exists.

Figure 4:
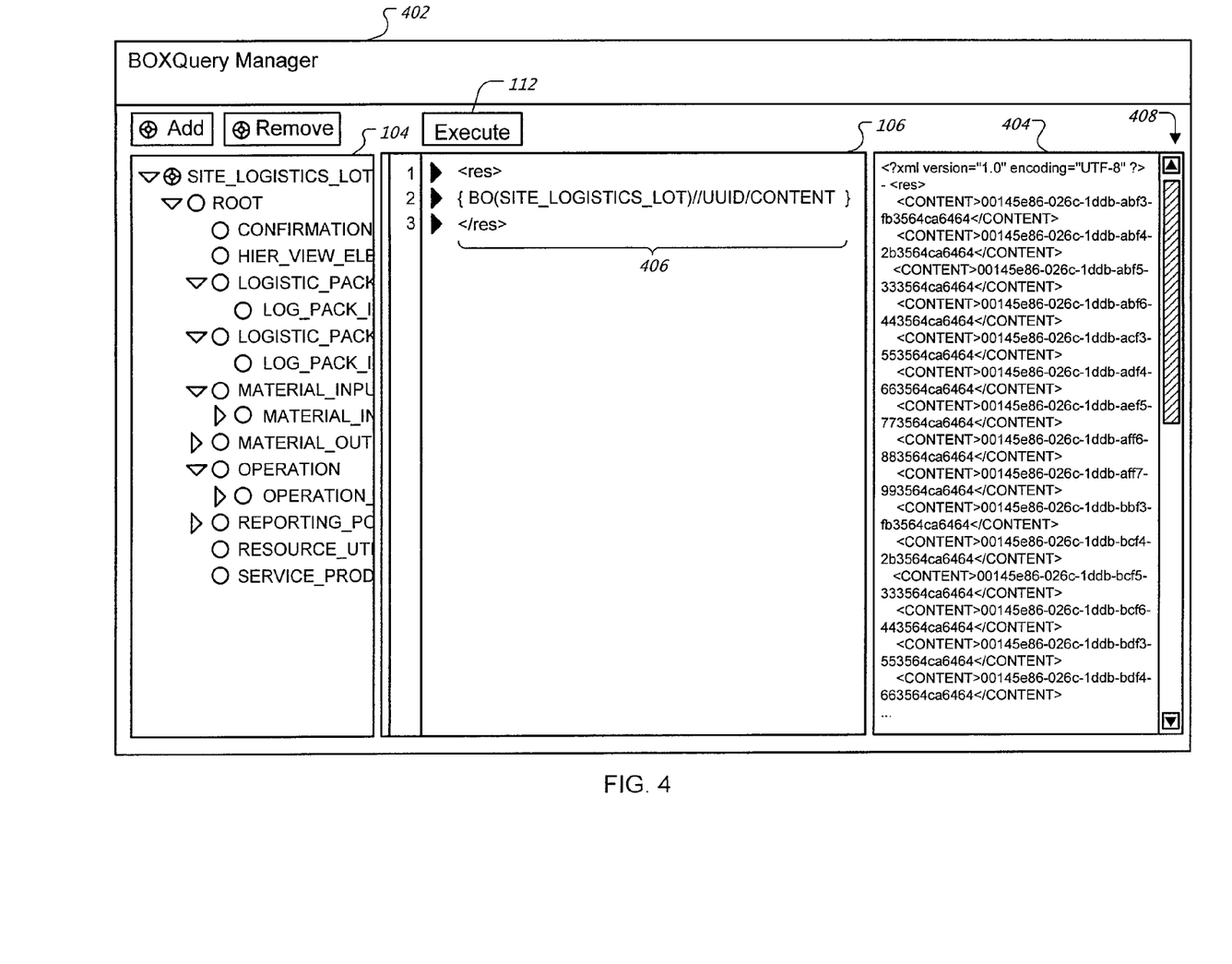
FIG. 4 is an exemplary screen shot of an interface showing the results of a business object-based query.

Upon completion of this aspect of the screen 302, the query system can display the next screen of the query specification/execution scenario. FIG. 4 is an exemplary screen shot 402 of an interface showing the results of a business object-based query, such as results that may be displayed after the user selects the "Execute" button 112 to execute the query 406. Specifically, the screen 402 includes one or more results 404 that may be generated as a result of executing the query 406. Although the query 406 can be directed toward non-XML objects, the results 404 can be in XML format.

The results 404 are retrieved using the completed query 406 and include the information that the query 406 specifies to be returned. For example, the query 406 contains no selective keywords (e.g., Where, etc.). Further, the business object name and association name (e.g., "CONTENT") serve as the "Return" component in a general "FLOWR" type of expression. As such, rows of data (or other such elements) comprising the results 404 include the label "CONTENT" which corresponds to the UUID-CONTENT association selection 308.

As another example, had the user selected at least one association of the business object for inclusion in the query one or more attributes under such an association would have been identified, in the non-XML object. Such attribute(s) would then have been extracted from the object and included in an XML document created for being the target of a query formulated according to the XQuery language.

Other queries analogous to query 406 may include other components of "FLOWR" expression, such as For, Let, Where and/or OrderBy. If these components are included in a query, for example, they can affect the amount and order of the contents of the results 404. For example, using the For and/or Where clauses can affect the extent to which elements are retrieved in the query (e.g., which data is to be matched). The OrderBy clause may affect the order of the entries in the results 404.

The results 404 can have various configurations, such as including a header and several "CONTENT" entries depicted in FIG. 4. The header may, for example, identify the version of XML used to generate the XML content of the results 404. The "CONTENT" entries correspond to the "CONTENT" association name in the query 406. Because the query 406 contains no Where clause or other such selection logic, the results 404 can represent the entire set of CONTENT associations for the Site Logistics Lot business object specified in the query. If the query 406 also includes other business objects, nodes and associations in addition to "SITE_LOGISTICS_LOT)//UUID/CONTENT," the corresponding entries are included in the results 404.

Processing for the query 406 may include first identifying non-XML portions, such as the names of particular business objects (e.g., SAP business objects). The business object names may be used to access non-XML files or data structures that define the business objects and may be part of a business model. Information from the non-XML files or data structures may be used to create an XML document from which XQuery can execute a query and generate results. The XML document that is created may also contain XML information that may be obtained directly from the original query.

During the execution of the query 406, the system may parse the query for portions of the query that contain symbols (e.g., a number of slashes) representing up to a predetermined number of hierarchy levels that can exist between the object name and the association. For example, two slashes exist in the query 406 between "Site Logistics Lot" and the UUID-CONTENT association. At execution time, the system may automatically resolve such symbolic hierarchy syntax, filling in the missing levels as needed to run the query. Such resolution may be based on syntax rules and the object model.

The screen 402 may include additional controls, for example, to handle large numbers of entries in the results 404. For example, a vertical scroll bar 408 may exist adjacent to the results 404 for scrolling up and down within the results 404, allowing the portions of the results to be displayed in the viewable area. Horizontal scroll bars may also be used. In some implementations, the query area 106 and the results 404 may be divided by a line such that simply moving the line (e.g., with the mouse) to the left or right automatically narrows one area (e.g., the query area 106) and while widening the other area (e.g., the results 404). Other controls may exist for shrinking the results 404 to an icon, such as to the bottom of the screen, and later restoring the area to its full size.

In some implementations, the screen 402 may include additional controls for saving the results 404 to a file, emailing the results 404 to email recipients, or using the results 404 in some other way. For example, the screen 402 may include a "save as" button or other control by which the user san save a result set to a file, such as for testing purposes.

In some implementations, the screen 402 may include additional controls for searching the results 404, such as for a specific UUID that may be in the results. In some implementations, the screen 402 may include additional controls for editing the contents of the results 404, such as for changing specific fields or values before they are saved to a file. In some implementations, the screen 402 may also include controls for highlighting portions of text in the results 404, so as to make the specific areas more visually noticeable.

The example query 406 may be considered a relatively simple query that the system can execute. However, more complex queries can be used. For example, a query for retrieving the business object roots (e.g., node_id and ID_content) and their items (e.g., Node_ID) for business object instances that include some items with the requested quantity larger than 1 may appear as a query such as:

```
<Result>
{
for $root in BO(SITE_LOGISTICS_REQUEST)/ROOT
let $items := $root/ASSOC(REQUEST_ITEM)/REQUEST_ITEM
where every $number in $items/REQUESTED_QUANTITY/CONTENT
satisfies $number > 1
return
<ResultRoot>
{$root/NODE_ID}
{$root/ID/CONTENT}
    <ResultItems>
        {$items/NODE_ID}
    </ResultItems>
</ResultRoot>
}
</Result>
```

Execution of this query can produce a result that identifies one or more nodes. For example, the result can include information such as a node identifier (e.g., labeled by NODE_ID) and content of the node (e.g., labeled by CONTENT), to name just a few examples. The nodes retrieved by the query can be arranged in an order determined by node-specific information, the order in which the nodes were found, or by any other prioritization. The result of the query can be presented to a user in a suitable user interface, for example as an XML list displayed on a computer screen.

Figure 5:
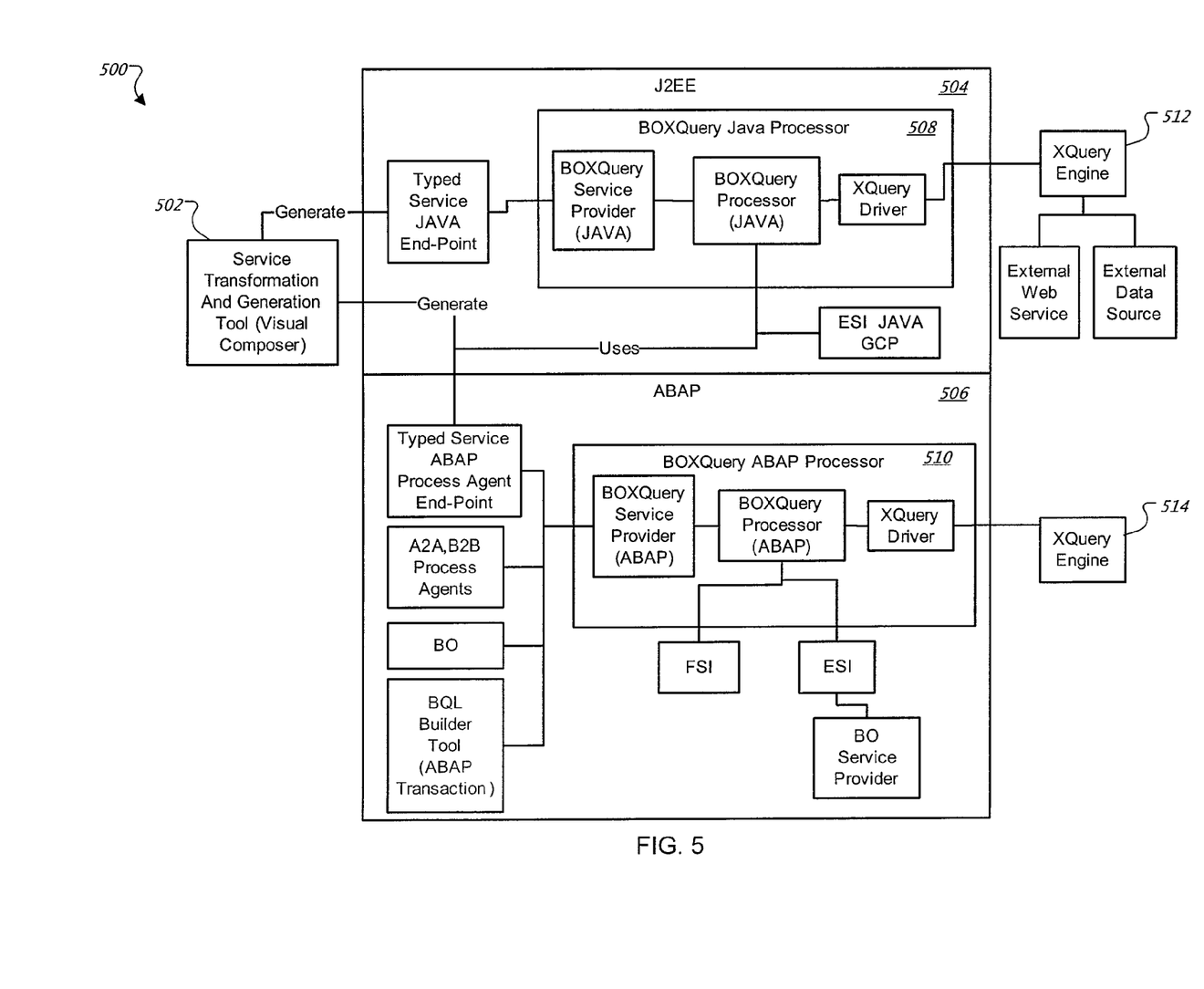
FIG. 5 is a schematic diagram of a system that processes object-based queries.

FIG. 5 is a schematic diagram of a system 500 that processes object-based queries. For example, the system 500 may be used to process a query on one or more non-XML objects, such as the exemplary query 406 that references the Site Logistics Lot business object. The system 500 uses an object model to define and create non-XML objects, the object model providing that attributes of the objects can be organized under nodes in a hierarchy, and that associations can be created between nodes in the same non-XML objects and/or in different non-XML objects.

To process a query, the system 500 can first receive a query configured to extract information from at least one of the non-XML objects. Portions of the query identified to be non-standard with regard to XQuery language are used to create an XML document from the non-XML object using at least the non-standard portion identified in the query. An XQuery engine 512, 514 within the system 500 performs a revised query (using the XQuery language) on the created XML document.

The system 500 includes a query composer 502. The user may use the query composer 502 to define queries on non-XML objects, such as by using aspects of the screens 102-402 of FIGS. 1-4 to create the query 406. The query composer 502 can include a GUI configured for the object model in which portions of the non-XML object can be selected by the user for use in the query.

To execute a query on non-XML objects, the query composer 502 can provide the query to a query processor. For example, the query processor may be the application software that receives a query (e.g., the query 406) when the user elects to execute the query (e.g., by selecting the execute button 112 depicted on FIG. 4). The query processor may reside in one or more application environments or platforms, such as a Java Platform 2 Enterprise Edition (J2EE) platform 504 or an Advanced Business Application Programming (ABAP) platform 506. Each of the platforms 504 and 506 includes a processor for processing object queries for non-XML objects. Specifically, the J2EE platform 504 includes a BOXQuery Java Processor 508, and the ABAP platform 506 includes a BOXQuery ABAP Processor 510. The processors 508 and 510 may include, for example, services that receive a non-XML object query, processors that handle the non-XML object aspects of the query, and drivers that provide a resulting XML-compliant query to an XQuery processor. For example, the processors 508 and 510 can create an XML document from the non-XML object implicated by the query using at least the non-standard portion identified in the query, and provide XQuery-compliant queries to one or more XQuery engines 512 and 514.

The XQuery engines 512 and 514 each can execute a received query and generate results, such as in XML format. A query received by either of the XQuery engines 512 or 514 can be the XQuery-compliant equivalent of the non-XML object query submitted for execution by the query composer 502. The revised query received by the XQuery processor(s) can be performed on the created XML object. The results of executing the query can be displayed, for example, in the results 404 as depicted in FIG. 4.

Figure 6:
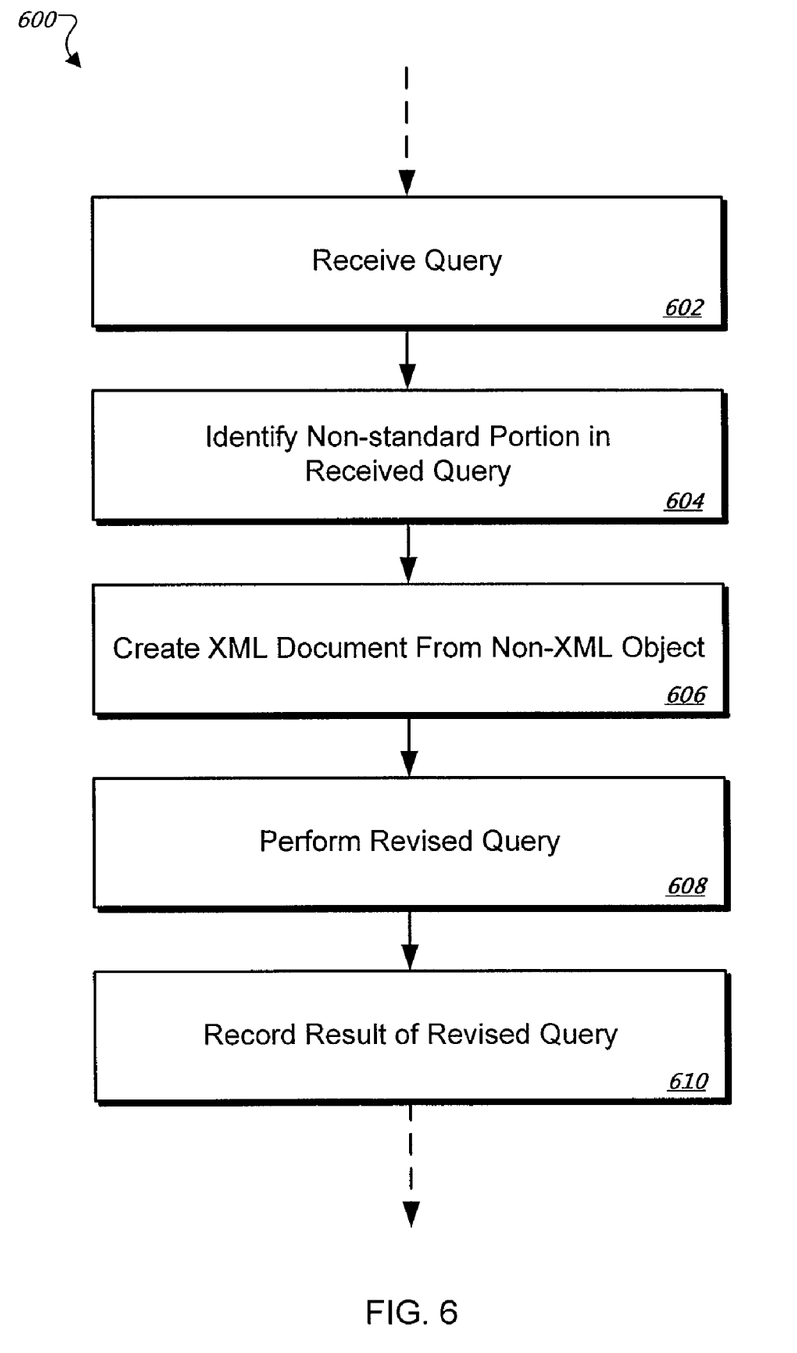
FIG. 6 is a flow chart of exemplary operations that can be performed in connection with the object-based query system.

FIG. 6 is a flow chart of exemplary operations 600 that can be performed in connection with the object-based query system. The operations 600 can be performed by a processor executing instructions stored in a computer program product.

The operations 600 begin in step 602 with receiving a query. For example, the query received may be the query 406 that references the Site Logistics Lot business object. The query is configured to extract information from a non-XML object created using an object model. The object model provides for organizing attributes under nodes in a hierarchy. The object model also provides for creating, within the non-XML object, associations between the nodes and to nodes in another non-XML object. For example, the hierarchical nodes 208 list example nodes for the Site Logistics Lot business object, and the node fields 306 list associations for the Confirmation Group node selection 304.

Step 604 identifies any portions of the received query that are non-standard with regard to XQuery language. For instance, the query may reference a non-XML object, such as the Site Logistics Lot business object that is included in the query 406. Specifically, the Site Logistics Lot business object may be an object that is part of the object model, and the underlying aspects of the business object may be non-XML. For example, part of the definition of the business object may be stored in non-XML files, such as non-XML files that SAP applications may use to represent business objects and maintain the business model.

Step 606 creates an XML document from the non-XML object using at least the non-standard portion identified in the query. For example, the system can create an XML document from the Site Logistics Lot business object referenced in the query 406. To create the XML document, the system may use application software described in reference to the process 500 in FIG. 5. For example, the system may use services of the J2EE platform 504 or the ABAP platform 506 to create an XML document that can be processed by XML-compatible query engines such as the XQuery engines 512 or 514.

In some implementations, creating the XML document in step 606 includes identifying information in the non-XML object necessary for performing the revised query, extracting the identified information from the non-XML object, and including the extracted information in the XML document. For example, the system can include the business object name (e.g., Site Logistics Lot) and its nodes and attributes in the XML document created.

Step 608 performs a revised query on the created XML document. The revised query corresponds to the query and is formulated using the XQuery language. For example, referring to FIG. 5, the XQuery engines 512 or 514 may perform the query received from the platforms 504 or 506.

Step 610 records a result of the revised query in response to the query. For example, the system can display the results of the revised query to the user, such as in the results 404 of the screen 402 (or other GUI screen). The results 404 can be in response to the query 406 that is considered non-XML because it references the non-XML business object Site Logistics Lot. The results 404 may include entries that match the selection criteria and specifications in the query 406. The results 404 may further include information that the user can visually correlate to the query 406, such as instances of "CONTENT" corresponding to the attribute of the business object Site Logistics Lot referenced in the query 406.

Figure 7:
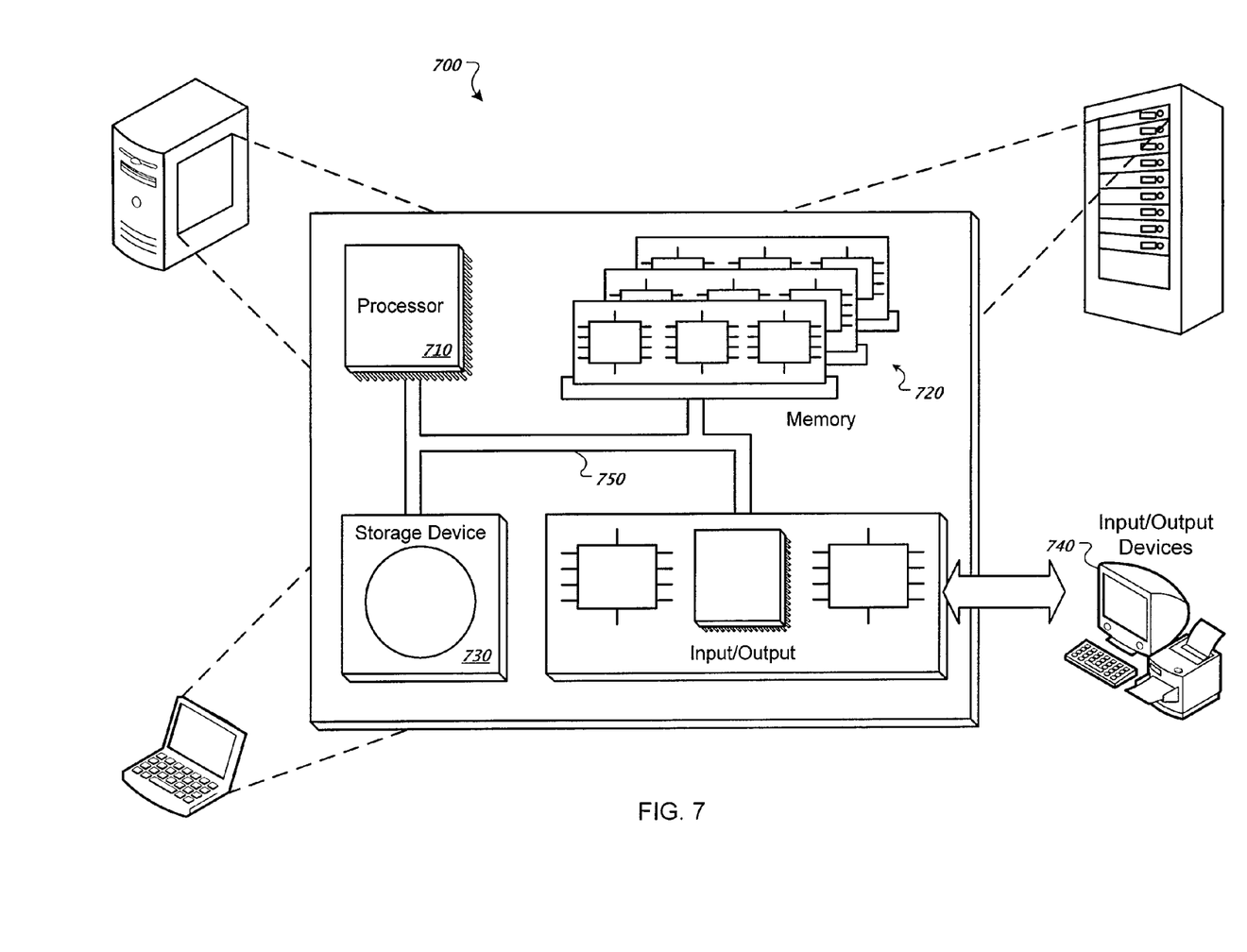
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system

700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for obtaining information from an object, the method comprising:
   receiving a query configured to extract information from a non-XML object, the non-XML object created using an object model that provides for: (1) organizing attributes under nodes in a hierarchy; and (2) creating, within the non-XML object, associations between the nodes, also to nodes in another non-XML object;
   identifying in the received query any portion thereof that is non-standard with regard to XQuery language;
   creating an XML document from the non-XML object using at least the non-standard portion identified in the query;
   performing a revised query on the created XML document, the revised query corresponding to the query and being formulated using the XQuery language; and
   recording, as a response to the query, a result of the revised query.

2. The computer-implemented method of claim 1, wherein creating the XML document comprises:
   identifying in the non-XML object any information necessary for performing the revised query;
   extracting the identified information from the non-XML object; and
   including the extracted information in the XML document.

3. The computer-implemented method of claim 1, wherein the received query identifies the non-XML object, and not the XML document, as a source for the query.

4. The computer-implemented method of claim 1, wherein the query identifies at least one association in the non-XML object and requests information retrieval regarding the identified at least one association.

5. The computer-implemented method of claim 4, wherein the non-XML object includes multiple associations, and wherein the query identifies fewer than all of the multiple associations and identifies at least one attribute under the multiple associations, further comprising:
- identifying at least one attribute under the multiple associations in at least one of the non-XML object and the other non-XML object referred to by any of the multiple associations;
- extracting the identified at least one attribute; and
- including the extracted attribute in the XML document.

6. The computer-implemented method of claim 1, wherein the non-standard portion of the query is a path definition identifying a part of the object, the path definition not formulated according to the XQuery language.

7. The computer-implemented method of claim 6, further comprising:
- interpreting a symbolic expression in the received query as signifying that up to a predetermined number of levels in the path definition have been omitted in the received query;
- identifying in the non-XML object any information whose object path corresponds to the path definition taking into account the interpreted symbolic expression;
- extracting the identified information from the non-XML object; and
- including the extracted information in the XML document.

8. The computer-implemented method of claim 1, wherein receiving the query comprises:
- generating a graphical user interface (GUI) configured for the object model;
- presenting, in the GUI and to a user, portions of the non-XML object such that any of the portions can be selected by the user;
- receiving an input corresponding to a selection in the GUI and by the user of at least one of the portions of the non-XML object; and
- formulating the query using the received input.

9. The computer-implemented method of claim 1, wherein the object model is for SAP Business Objects.

10. A computer program product tangibly embodied in a computer-readable medium and comprising instructions that when executed by a processor perform a method for obtaining information from an object, the method comprising:
- receiving a query configured to extract information from a non-XML object, the non-XML object created using an object model that provides for: (1) organizing attributes under nodes in a hierarchy; and (2) creating, within the non-XML object, associations between the nodes, also to nodes in another non-XML object;
- identifying in the received query any portion thereof that is non-standard with regard to XQuery language;
- creating an XML document from the non-XML object using at least the non-standard portion identified in the query;
- performing a revised query on the created XML document, the revised query corresponding to the query and being formulated using the XQuery language; and
- recording, as a response to the query, a result of the revised query.

11. A computer program product tangibly embodied in a computer-readable medium, the computer program product including instructions that, when executed, generate on a display device a graphical user interface for obtaining information from an object, the graphical user interface comprising:
- an object identification area for a user to enter an identification of a non-XML object, the non-XML object created using an object model that provides for: (1) organizing attributes under nodes in a hierarchy; and (2) creating, within the non-XML object, associations between the nodes, also to nodes in another non-XML object;
- an object portion selection area for presenting portions of the identified non-XML object such that any of them can be selected by the user; and
- a query editing area for the user to enter a query formulated using XQuery language without explicitly identifying any document in XML format;
- wherein an XML document is created to include any portion of the non-XML object selected by the user in the object portion selection area, and wherein the query entered by the user in the query editing area is performed on the created XML document.

12. The computer program product of claim 11, wherein the graphical user interface further comprises:
- a result presentation area presenting a result of performing the entered query on the created XML document.

13. A computer system comprising:
- a plurality of non-XML objects created using an object model that provides for: (1) organizing attributes under nodes in a hierarchy; and (2) creating, within each of the non-XML objects, associations between the nodes, also to nodes in another of the non-XML objects;
- a query processor configured to: (i) receive a query configured to extract information from at least one of the non-XML objects, (ii) identify in the received query any portion thereof that is non-standard with regard to XQuery language, and (iii) create an XML document from the non-XML object using at least the non-standard portion identified in the query; and
- an XQuery processor configured to perform a revised query on the created XML document, the revised query corresponding to the query and being formulated using the XQuery language.

14. The computer system of claim 13, wherein the query processor is further configured to: (iv) generate a graphical user interface (GUI) configured for the object model; (v) present, in the GUI and to a user, portions of the non-XML object such that any of the portions can be selected by the user; (vi) receive an input corresponding to a selection in the GUI and by the user of at least one of the portions of the non-XML object; and (vii) formulate the query using the received input.

* * * * *